H. L. AUSTIN.
COASTER WAGON.
APPLICATION FILED JUNE 11, 1915.

1,165,832. Patented Dec. 28, 1915.

Witnesses
Fenton H. Belt
J. H. Sherwood

Inventor
Harry L. Austin
By Franklin H. Hough
Attorney

UNITED STATES PATENT OFFICE.

HARRY LLOYD AUSTIN, OF HURON, SOUTH DAKOTA.

COASTER-WAGON.

1,165,832.

Specification of Letters Patent.

Patented Dec. 28, 1915.

Application filed June 11, 1915. Serial No. 83,584.

*To all whom it may concern:*

Be it known that I, HARRY L. AUSTIN, a citizen of the United States, residing at Huron, in the county of Beadle and State of South Dakota, have invented certain new and useful Improvements in Coaster-Wagons; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in coaster wagons and consists of a simple and efficient apparatus of this nature having various details of construction, combinations and arrangements of parts which will be hereinafter fully described, shown in the accompanying drawings and then specifically defined in the appended claims.

Figures 1, 2:
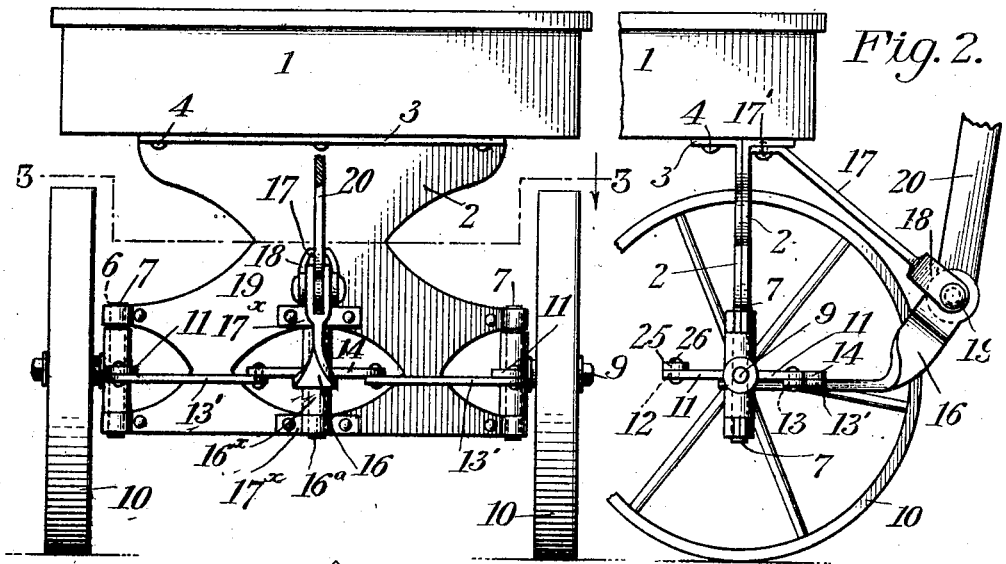
Figure 3:
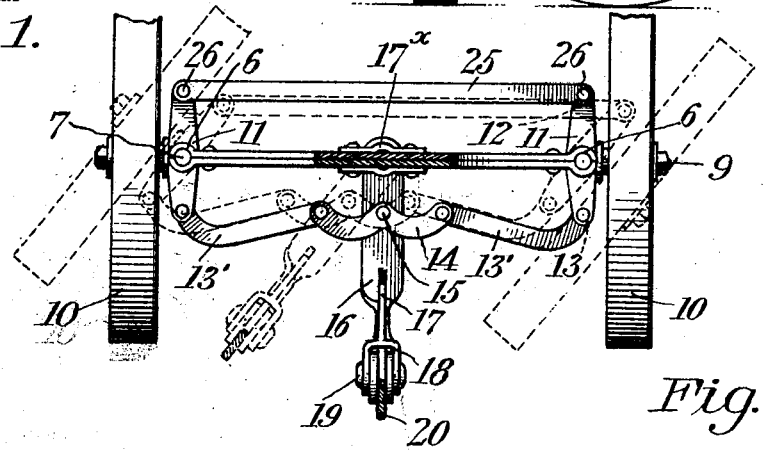
Figure 4:
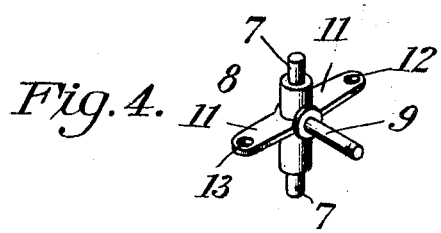

I illustrate my invention in the accompanying drawings, in which:

Figure 1 is a front elevation of the wagon. Fig. 2 is a side elevation of a portion of the wagon. Fig. 3 is a top plan view of a part of the apparatus on line 3—3 of Fig. 1, and Fig. 4 is a detail perspective view.

Reference now being had to the details of the drawings by numeral, 1 designates the box of the wagon and, 2, 2 designate two bolster plates which are fastened together and have flanged ends 3 held by means of the bolts 4 to the bottom of the box. Each of said plates has forked ends, as shown in Fig. 1, each of which is bent to form curved recessses 6, as shown in top plan view Fig. 3, and which form bearings for the pintles 7 of the member 8 which has a stub axle 9 upon which the wheel 10 is journaled.

Projecting laterally from the member 8 are the wings 11, having apertures 12 and 13 therein, to the former of which the curved links 13' are pivoted which in turn are pivoted to the outer end of the curved link 14, pivotally mounted upon the pin 15, carried by the steering tongue 16 which is fastened to a boss 16˟ having pintles 16ᵃ journaled in bearings 17˟ fastened to the members 2. A bar 25 is pivotally connected through the medium of the pins 26 with the links 13'. An adjustable brace bar 17, having a forked end 18, is held by means of a pin 19 to the tongue 16 and its other end connected to a pivot 17' secured to the wagon box. A handle 20 is pivotally connected to the pin 19 and forms means whereby the forward axle may be swung to the right or left, accordingly as it may be desired to steer the vehicle.

What I claim to be new is:—

1. A coaster wagon comprising combined axle and bolster plates, secured together and provided with registering recessses at the center and ends thereof, bearings, one above the other, formed in the walls of said end recessses, T-shaped stub axles having ends journaled in said bearings, laterally and oppositely disposed wings intermediate the spindle ends, a bar connecting corresponding wings upon one side of the combined axle bolster, and pivotal link connections between the other wings of the stub axle.

2. A coaster wagon comprising combined axle and bolster plates, secured together and provided with registering recesses at the center and ends thereof, bearings, one above the other, formed in the walls of said end recessses, T-shaped stub axles having ends journaled in said bearings, laterally and oppositely disposed wings intermediate the spindle ends, a bar connecting corresponding wings upon one side of the combined axle bolster, a tongue pivotally mounted in suitable bearings in said central recess, a link pivoted to said tongue, and links pivotally connected to wings upon the stub axle and to the ends of the link which is pivotally mounted upon said tongue.

3. A coaster wagon comprising combined axle and bolster plates, secured together and provided with registering recesses at the center and ends thereof, bearings, one above the other, formed in the walls of said end recessses, T-shaped stub axles having ends journaled in said bearings, laterally and oppositely disposed wings intermediate the spindle ends, a bar connecting corresponding wings upon one side of the combined axle bolster, a tongue pivotally mounted in suitable bearings in said central recess, a link pivoted to said tongue, links pivotally connected to wings upon the stub axle and to the ends of the link which is pivotally mounted upon said tongue, and an adjustable bar pivoted to the tongue and to the upper portion of the combined axle and bolster.

In testimony whereof I hereunto affix my signature in presence of two witnesses.

HARRY LLOYD AUSTIN.

Witnesses:
 C. S. JONES,
 W. H. ALLINGHAM.